United States Patent
Ullman et al.

(10) Patent No.: US 6,631,362 B1
(45) Date of Patent: Oct. 7, 2003

(54) GENERAL DECISION-MAKING SUPPORT METHOD AND SYSTEM

(75) Inventors: David G. Ullman, Corvallis, OR (US); Bruce D. D'Ambrosio, Corvallis, OR (US)

(73) Assignee: Robust Decisions

( * ) Notice: Subject to any disclaimer, the term of this patent is extended or adjusted under 35 U.S.C. 154(b) by 489 days.

(21) Appl. No.: 09/691,628

(22) Filed: Oct. 18, 2000

Related U.S. Application Data (60) Provisional application No. 60/203,023, filed on May 9, 2000.

(51) Int. Cl.$^7$ ............................ G06F 17/00; G06F 15/18

(52) U.S. Cl. .............................. 706/60; 706/21; 706/47

(58) Field of Search ............................ 706/60, 21, 47

(56) References Cited

U.S. PATENT DOCUMENTS

| | | | | | |
|---|---|---|---|---|---|
| 5,182,793 | A | * | 1/1993 | Alexander et al. ............ | 706/13 |
| 5,870,730 | A | * | 2/1999 | Furuya et al. ................. | 706/52 |
| 5,999,923 | A | * | 12/1999 | Kowalski et al. .............. | 706/47 |
| 6,012,051 | A | * | 1/2000 | Sammon Jr. et al. .......... | 706/52 |
| 6,389,406 | B1 | * | 5/2002 | Reed et al. .................... | 706/46 |
| 2002/0107824 | A1 | * | 8/2002 | Ahmed .......................... | 706/46 |

OTHER PUBLICATIONS

Balasubramanian et al, "A Systematic Approach to Support the Idea Generation Phase of the Interface Design Process", IEEE Proc. 31st Annual Hawaii International Conference on System Sciences, 1998.*

Derald Herling and David G. Ullman, "Engineering Decision Support System (EDSS)," 1995, pp. 619–626.

David G. Ullman and Derald Herling, "Computer Support for Design Team Decisions," Lancaster Workshop on AI System Support for Conceptual Design, Mar. 1995, pp. 1–13.

D. G. Ullman and B. D'Ambrosio; "An Introduction to the Consensus Model of Engineering Design Decision Making"; ASME 1998 Proceeding of the Design Theory and Methodolgy Conference; Sep. 1998; Atlanta, GA; there are no page numbers as the proceeding is on CD (14 pages).

David G. Ullman, Derald Herling and Bruce D'Ambrosio; "What to Do Next: Using Problem Status to Determine the Course of Action"; *Research in Engineering Design 1997*; pp. 214–227.

David G. Ullman; "The Mechanical Design Process"; McGraw–Hill Companies 1997; pp. 152–172.

Lucienne T.M. Blessing; "A Process–Based Approach to Computer–Supported Engineering Design"; Black Bear Press Ltd., Cambridge, Great Britain 1994; p. 182.

Bruce D'Ambrosio; "Local Expression Languages for Probabilistic Dependence"; *International Journal of Approximate Reasoning*; Elsevier Science, Inc., New York, New York; 1994; pp. 1–16.

(List continued on next page.)

*Primary Examiner*—George B. Davis
(74) *Attorney, Agent, or Firm*—Marger Johnson & McCollom, P.C.

(57) ABSTRACT

To identify the best choice from a set of alternatives, team members select the criteria to be used in identifying the best choice. Each criterion describes at least one feature of the alternatives. Each team member then, for each alternative, defines a target value for the feature of the criteria and sets a level of knowledge about the feature of the criteria. Using the target values and the team member's knowledge of each feature, each team member estimates how well the alternatives meet the target values for the features. The system then calculates an expected utility for each alternative based on the team member's estimations and a probability that each alternative is the best choice. Finally, based on the expected utility and probability that each alternative is best, a best choice is identified.

27 Claims, 9 Drawing Sheets

OTHER PUBLICATIONS

David G. Ullman, Thomas G. Dietterich and Larry A. Stauffer; "A Model of the Mechanical Design Process Based on Empirical Data"; *Artificial Intelligence for Engineering Design, Analysis and Manufacturing*; vol. 2, Issue 1; 1988; pp. 33–52.

Larry A. Stauffer & David G. Ullman; "Fundamental Processes of Mechanical Designers Based on Empirical Data"; *Journal of Engineering Design*; vol. 2; No. 2; 1991; pp. 113–125.

Yakemovic & Conklin; Report on a Development Project Use of an Issue Based Information System; Technical Report STP279–90; MCC; Jun. 1990; 18 pages.

Yakemovic & Conklin; The Capture of Design Rationale on an Industrial Development Project; Preliminary Report; Technical Report STP279–89; MCC; Jul. 1989; 14 pages.

* cited by examiner

Computer

GENERAL DECISION-MAKING SUPPORT METHOD AND SYSTEM

This application claims the benefit of provisional application No. 60/203,023, filed May 9, 2000.

This invention was made with Government support under contract DAAH01-99-C-R191 awarded by the U.S. Army Aviation and Missile Command. The Government has certain right in the invention.

FIELD OF THE INVENTION

This invention relates to methods and systems that assist users in evaluating multiple alternatives and decision-making based on this evaluation.

BACKGROUND OF THE INVENTION

Based on a natural model of team deliberation, a system that enables team decision support has been developed. This is the result of over fifteen years of studying and modeling design engineers and the integration of research results from the fields of negotiation and argumentation modeling, design rationale capture, decision theoretics, and engineering best practices. The method underlying the system integrates concepts such as criteria development, value modeling, argumentation, negotiation and evaluation into the engineering design workflow.

Patents in the field of general decision support are not common. U.S. Pat. No. 5,182,793 to Alexander et al., entitled "Computer-Aided Decision Making With A Symbolic Spreadsheet," issued Jan. 26, 1993, and U.S. Pat. No. 6,012,051 to Sammon Jr. et al., entitled "Consumer Profiling System With Analytic Decision Processor," issued Jan. 4, 2000, both use other methods to support decision-makers.

Accordingly, a need remains for a way to assign semantic meaning to documents without requiring user involvement, and for a way to search for documents with content similar to a given document.

SUMMARY OF THE INVENTION

One aspect of this invention is a method for aiding individuals or teams in making a decision that requires selecting from a list of alternatives. The method is applicable to any problem that has: known or discoverable boundaries; many potentially acceptable alternatives for solving the problem; criteria that can be developed to measure how well the alternatives solve the problem; one or more decision-makers that have a stake in the solution of the problem; decision-makers with expertise in different areas and may represent different, even conflicting viewpoints; and all decision-makers must be interested in solving the problem.

Features of the method allow for analytical support even when information about the alternatives is incomplete or conflicting and when the decision-makers have different opinions about what features of the alternatives are important. Information describing the evaluation can be both quantitative and qualitative and can be changing as more is learned about the problem. Results from the analysis are measures of each alternative's satisfaction, its probability of being the best choice, decision-maker consensus and a sensitivity analysis tailored to give guidance about what to do next to refine the decision.

Technical advantages of this system are that it supports human decision-makers by enhancing their natural behavior. It helps them organize information and encourages sound decision-making skills. Further, it provides an analytical basis for decision-making that is transparent and can be used with no need for analysis by the decision-makers. The results help the decision-makers by giving them a strategy to resolve issues. Often, if a problem is not being resolved, the only action is frustration. The methods help get problems unstuck by giving cost/benefit information so they can rationally decide what to do next to reach a decision.

The input, evaluation, and resulting information serve as a medium to communicate what is important to other team members. The largest single problem in teamwork is poor communication. The method and system presented give a framework for decision-making communication. The representation and analysis also helps the team develop a common understanding of issues and alternative solutions. Further it provides documentation of the decision and the rationale for it.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
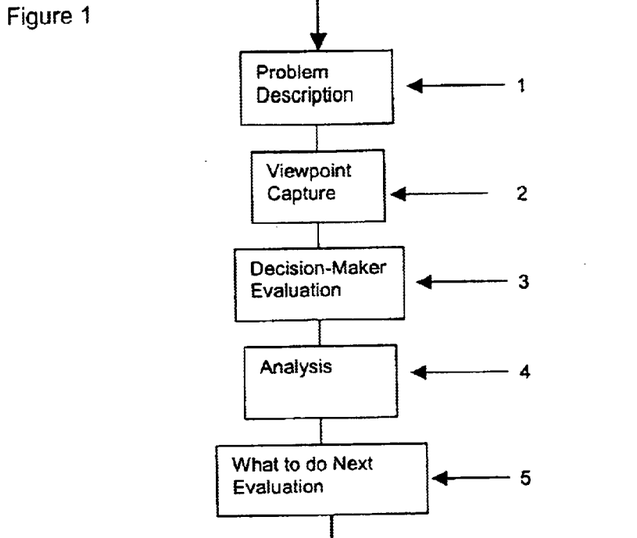
FIG. 1 is a block diagram of the decision-making steps in the preferred embodiment in this invention.

FIG. 1 represents a flow chart of the major sections of the present invention. The methodology of any embodiment of the invention includes the steps of describing the problem 1, that allows recording of the alternative to be considered, the criteria that will be used to judge them and the decision-makers who are evaluating the alternatives; a method for viewpoint capture 2, that allows each decision-maker to express the relative importance of the criteria; a mechanism for allowing the decision-makers to evaluate the alternatives relative to the criteria 3; an analysis engine 4, that, based on the captured information, calculates the satisfaction of each alternative, its probability of being the best choice and sensitivity information; and a what to do next evaluation 5, that advises the decision-makers how to interpret the results and what information to refine that will increase the satisfaction and probability of being the best choice. The what to do next evaluation recommends iteration back to items 1–3 for further work only as needed, saving wasted effort.

Figure 2:
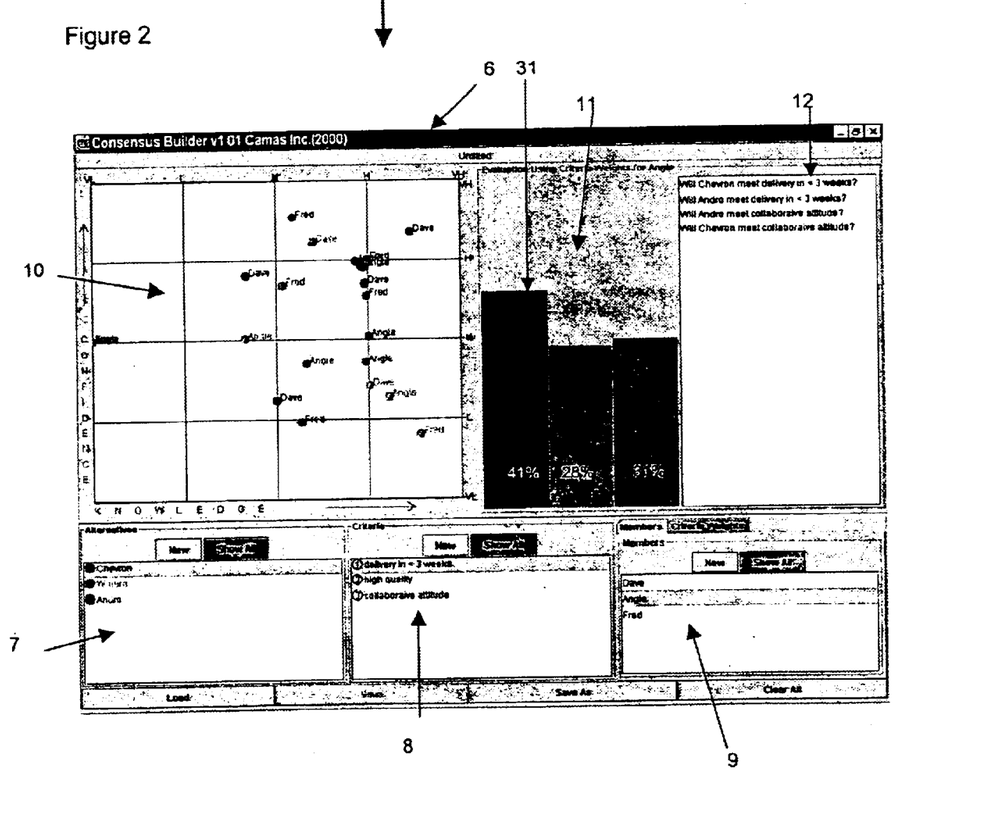
FIG. 2 illustrates a display screen showing how the embodiment of the invention is used.

According the present embodiment FIG. 2, all the activities in FIG. 1, are captured, displayed and managed on a single screen 6. The problem description 1 is captured in areas 7,8,9. Area 7 allows for a plurality of alternatives input by the decision maker(s). This can include text strings as shown or links to other material on the host computer or elsewhere on the Internet.

Area 8 allows for representation of a plurality of quantitative or qualitative criteria to be used to measure the features of the alternatives as a basis for choosing which is best. These criteria are characterized by the feature measured, the type of target (<, >, = or Y/N), target values, and units. For Y/N criteria there are no target values as this type is for qualitative criteria. For other types, each target is defined by at least two values describing each member's "delighted" value, and their "disgusted" or "displeased" value. For example, a decision-maker may be delighted with a car that got 30 miles per gallon (mpg) and disgusted with one that got 22 mpg. Each member can have a different set of target defining values. Continuing the example, another member of the decision-making team may be delighted with 34 mpg and disgusted with 27 mpg. Input of criteria can include text strings as shown or links to other material on the host computer or elsewhere on the Internet.

A plurality of decision-makers ranging from a single individual to a team is captured in area 9. This list is input directly as a text string or from a list elsewhere on the host computer or on the Internet.

Figure 3:
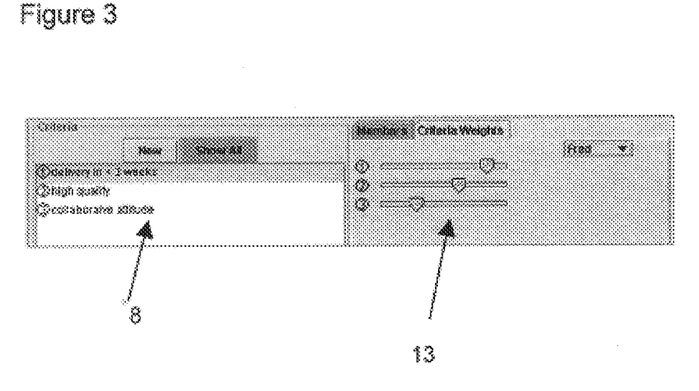
FIG. 3 illustrates a display screen showing how the input of importance weightings is performed in the preferred embodiment.

Each of the decision-makers may have a unique opinion about what is important. A user interface shown in FIG. 3 allows each member to signify the relative importance 13 of each criterion 8. This importance expresses each member's viewpoint. The embodiment shown in FIG. 3 uses sliders to capture the importance weightings. Other possible methods base this on ranking, pairwise comparisons or normalization.

Each decision-maker evaluates the alternatives relative to the features defined by the criteria. Evaluation does not have to be complete or consistent. Evaluation is captured on a Belief Map 10, and FIGS. 4, 5, and 6. The belief map provides a novel, yet intuitive means for entering/displaying the evaluation results in terms of knowledge and confidence. Each decision-maker has unique knowledge about each feature of each alternative. Belief maps offer a quick and easy to use tool for an individual or a team to ascertain the status of an alternative's ability to meet a criterion and to visualize the change resulting from analysis, experimentation or other knowledge increase.

Figure 4:
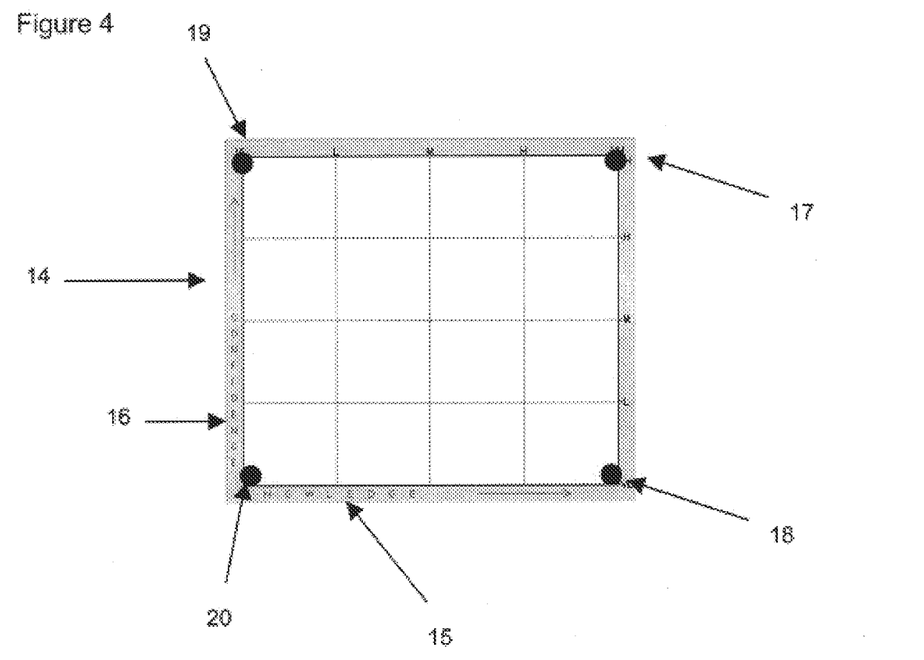
FIG. 4 shows a basic Belief Map.
Figure 5:
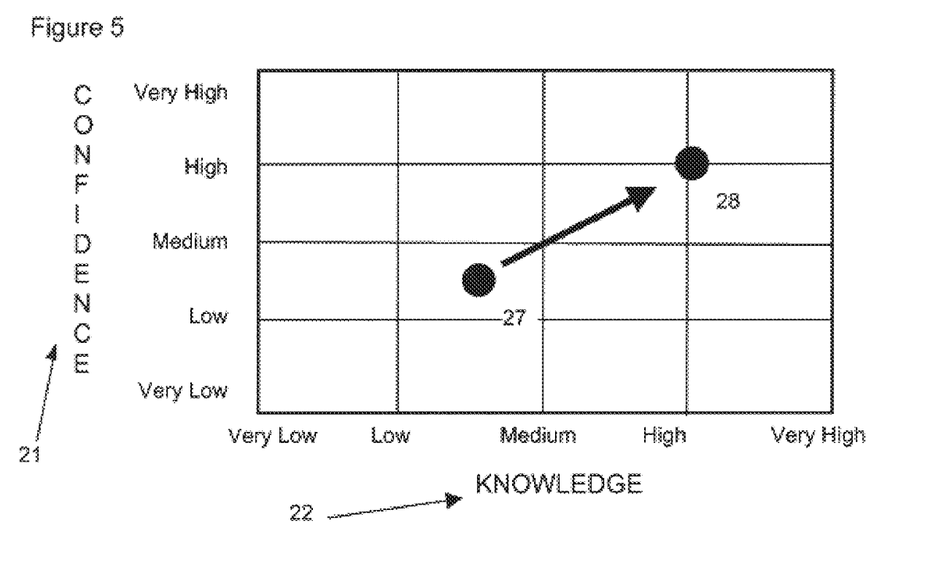
FIG. 5 illustrates how a Belief Map works.

Evaluation on a Belief Map is based on two orthogonal parameters as shown in FIGS. 4 and 5: knowledge 15 and 22 and confidence 16 and 21. The level of satisfaction with an alternative is based on the belief in how well the alternatives meet the targets. In a Belief Map, knowledge about an alternative is plotted against the decision-maker's confidence in the alternative's ability to meet a target.

Figure 7:
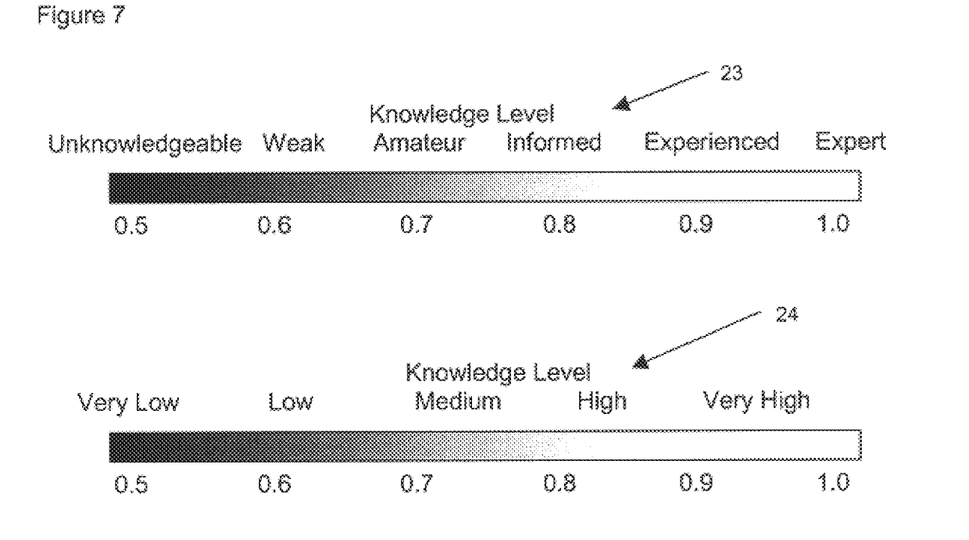
FIG. 7 illustrates scales for quantifying knowledge.

Knowledge was defined as "a measure of the information held by a decision-maker about some feature of an alternative." The greater the decision-maker's knowledge about a feature of an alternative, the less uncertainty there is in the evaluation of this feature. FIG. 7 shows two ways to measure knowledge. One way is to associate words generally used to describe knowledge with the probability of having correct information 23. An individual with "expert" knowledge would be able to correctly answer 100% of the questions concerning an alternative's feature (probability=1.0). At the other end of the scale an "unknowledgeable" individual would have a 50/50 chance of guessing correct information (probability=0.5). A second method to measure knowledge is to use a simple 5-step scale 24.

Confidence is a measure of how well an alternative meets the target set in a criterion. Each decision-maker may have a different level of confidence for each feature of each alternative. Two members of the same team can look at the same data developed through analysis experimentation or other means and have different confidences based on the same results. Confidence is based on the individual's judgment of all the available information. This judgment is dependent on prior knowledge, and on understanding of the alternative and the criterion being used to measure it.

Figure 8:
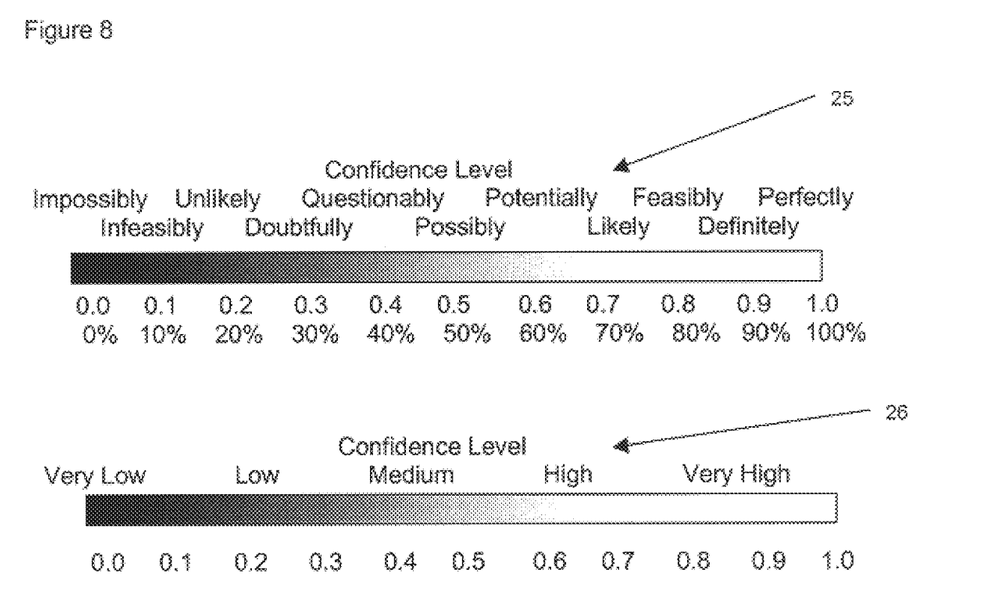
FIG. 8 illustrates scales for quantifying confidence.

As with knowledge, words describing confidence can be associated with probabilities. Confidence measures for qualitative criteria can be made using qualitative terms. Two scales for qualitatively measuring confidence are given in FIG. 8. The first scale 25 uses words that indicate some level of confidence. A second method to measure confidence is to use a simple 5-step scale 26.

For quantitative criteria, ones where the features are measurable and there are numerical targets, confidence is a measure of how well an alternative meets the ideal goal for the feature. For these types of criteria numerical values representing the target are fitted to the confidence scale. One embodiment of this, for example, is to ask the decision-maker "what is the value for the feature that will delight you" and also ask, "what will be the value for the feature that will disgust you". The delighted value corresponds to full confidence (1.0) and the disgust value corresponds to no confidence (0.0). The vales in between can be distributed linearly or by some other method. What makes this unique is that the decision-maker puts his/her point on the resulting scale removing the need for estimating the relationship between value and resulting satisfaction found in most other methods.

For quantitative criteria knowledge is a measure of the uncertainty in the estimation of value for the alternative. For example, if the decision-maker is sure that the gas mileage is 26 mpg then knowledge is high. If it is-only known to be between 25 and 28 then uncertainty is high and knowledge is low. It is possible to relate the uncertainty to the delighted and disgusted values to obtain an estimate of knowledge.

Belief is a single value that incorporates knowledge and confidence to give a probability of how well an alternative meets a target. Belief is entered on a Belief Map as in FIGS. 4,5,6.

In FIG. 4 a Belief Map 14 is shown with four points 17, 18, 19, and 20 signifying four different evaluations. If a feature of an alternative is plotted in the upper right corner 17, then the person who put it there is an expert, confident that the alternative meets the criterion (knowledge=1.0, confidence=1.0), if in the lower right corner 18, the expert is confident that it does not meet the criterion (knowledge= 1.0, confidence=0.0), if in the upper left corner 19 the decision maker knows little but is sure that the target is met (knowledge=0.5, confidence=1.0) and, evaluation in the lower left corner 20 (knowledge=0.5, confidence=0.0) is for the evaluation based on no knowledge but confidence that the alternative does not meet the target at all.

FIG. 5 shows the evolutionary use of a Belief Map. Here a decision maker has evaluated an alternative 27 and determined that, based on medium low knowledge, they have medium low confidence in the alternative meeting the target.

Later in their evaluation they may have learned enough 28 to rate their knowledge about this feature of the alternative as high and this increased knowledge has increased their confidence to high also.

Figure 12:
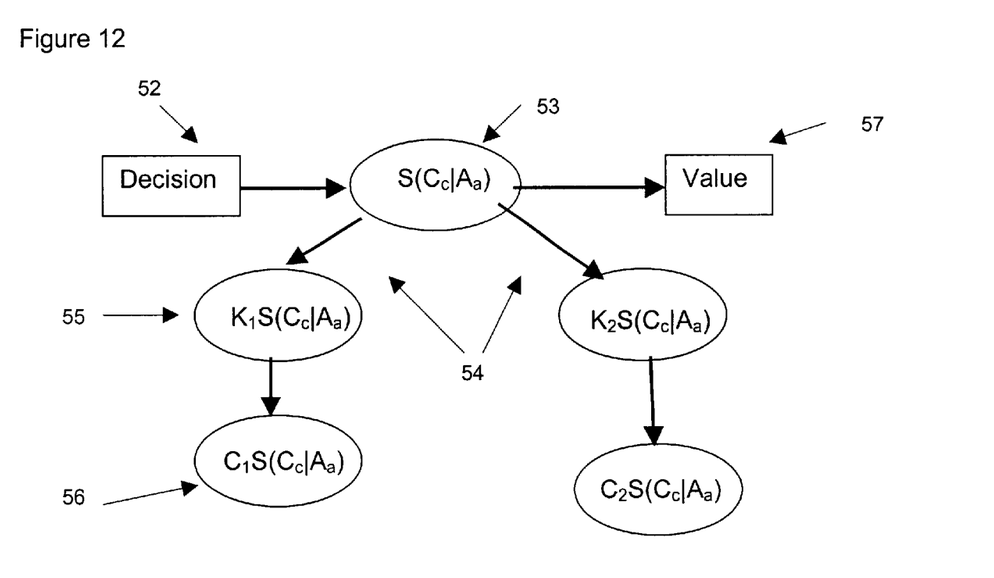
FIG. 12 shows an influence diagram.

Input of information about alternative, criteria (features and targets), decision-makers, importance weightings and the evaluation of alternative's features in terms of knowledge and confidence complete the information gathering necessary for analysis. It may seem that this representation for a decision problem is rather simplistic and ad-hoc. However, extensive research into modeling decision-making processes in design supports this representation. In addition, there is a fairly straightforward mapping from our embodiment of the representation to an influence diagram as shown in FIG. 12. This diagram contains representations of the alternatives available, the criteria by which alternatives will be judged, the relative importance of the criteria, and design team member opinions on the likelihood that various alternatives meeting various criteria.

In FIG. 12 the box labeled "Decision" 52 takes as values the alternatives for resolving the issue represented by the diagram. The circle labeled $S(C_c|A_a)$ 53 represents the satisfaction of criterion $C_c$ given alternative $A_a$ and will be called a satisfaction node. While we show only one, there can be one for each alternative/criterion combination. This is nonstandard, as a usual influence diagram would have only one node for each criterion. We use contingent nodes to represent each alternative/criterion pair separately, since we may not have arguments for every pair. The pair of two-node chains 54 hanging from $S(C_c|A_a)$ represents opinions posted by decision-makers. Two are shown here, but there can be any number of such chains hanging from each of the $S(C_c|A_a)$ satisfaction nodes. The higher of the two circles 55 represents the state of participant knowledge about the ability of the alternative to meet the criterion, and the lower circle 56 is a diagram artifact used to encode probabilistic evidence. The upper node (we will call this a knowledge node) is denoted as $K_m S(C_c|A_a)$, where a is the alternative, c is the criterion, and m is the decision-maker. The lower node takes a single value, true. The conditional probability of the knowledge node given the actual satisfaction has two degrees of freedom. We reduce this to a single degree by assuming symmetry to simplify knowledge acquisition. That is, we assume $$P(K_m S(C_c|A_a)=yes|S(C_c|A_a)=yes) = P(K_m S(C_c|A_a)=no|S(C_c|A_a)=no).$$

This single degree of freedom is the knowledge the participant has about the alternative/criterion combination, because this single parameter encodes how accurately the participant belief reflects the actual world state. The complete distribution for a knowledge node, then, is:

| $S(C_c|A_a)$ | $P(K_m S(C_c|A_a) = yes|S(C_c|A_a))$ |
|---|---|
| yes | $K_{c,a,m}$ |
| no | $1 - K_{c,a,m}$ |
| $S(C_c|A_a)$ | $P(K_m S(C_c|A_a) = no|S(C_c|A_a))$ |
| yes | $1 - K_{c,a,m}$ |
| no | $K_{c,a,m}$ |

We allow $K_{c,a,m}$ to range between 0.5 and 1.0, where 1.0 represents perfect knowledge and 0.5 represents complete ignorance, and use the textual scale describe FIG. 7 to acquire it.

We will refer to the lower node 56 as the Confidence node, $C_m S(C_c|A_a)$. The confidence node has only one value, all that matters is the ratio of the probabilities for that value given $K_m S(C_c|A_a)$. We acquire this as the "probability that the alternative will satisfy the criterion, given the participant state of knowledge" That is, we treat the participant as a making a noisy or soft observation (report) on his or her belief. We encode this as a pair of numbers constrained to sum to one, as follows:

| $K_m S(C_c|A_a)$ | $C_m S(C_c|A_a)$ |
|---|---|
| Yes | $C_{c,a,m}$ |
| no | $1 - C_{c,a,m}$ |

Finally, we assume value is additively decomposed into subvalues for each criterion, and that the value of not satisfying any criterion is 0, and assign weights to the relative values of criteria with the constraint that weights sum to 1.

Given the above semantics, the expected value or satisfaction of an alternative is:

$$Ev(A_a) = \Sigma_c V(C_c) P(S(C_c|A_a)=yes)$$

where $$P(S(C_c|A_a)=yes) = \alpha \pi_m(C_{c,a,m} K_{c,a,m} + (1-C_{c,a,m})(1-K_{c,a,m}))$$

and $\alpha$ is a normalization factor:

$$\alpha = 1/(\pi_m(C_{c,a,m} K_{c,a,m} + (1-C_{c,a,m})(1-K_{c,a,m})) + \pi_m(C_{c,a,m}(1-K_{c,a,m}) + (1-C_{c,a,m})(K_{c,a,m})))$$

The expected value for the decision, then, is just:

$$Ev(\text{Decision}) = \max_A Ev(A_a)$$

The probability of an alternative being the best is calculated by determining the probability mass of that portion of the outcome space in which the selected alternative has a higher utility that any other alternative. One particularly efficient method for performing this calculation is to compute by exact means the fused belief for each alternative/criterion pair, and then use Monte Carlo sampling starting from the fused beliefs to construct utility value samples for each alternative.

Figure 6:
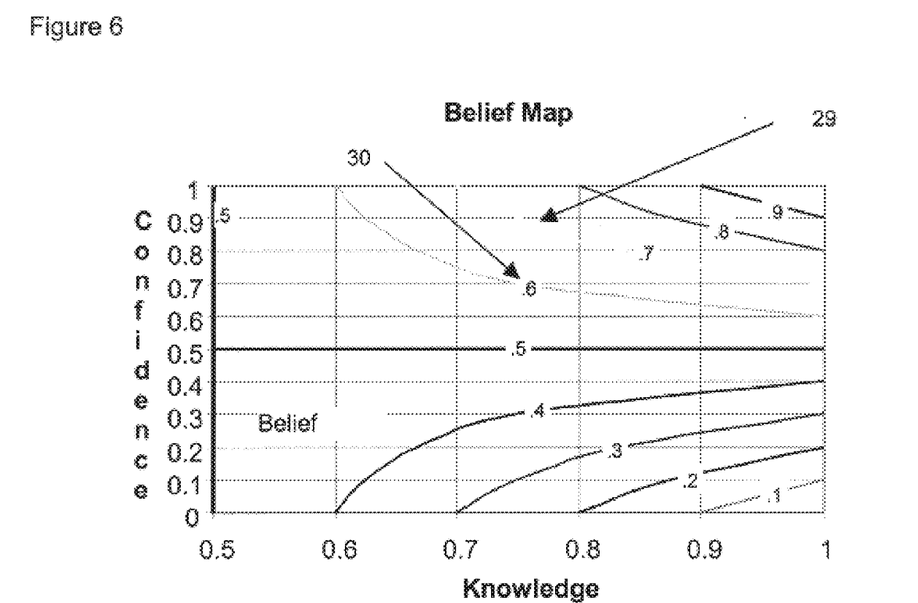
FIG. 6 illustrates the isolines of fused belief.

In FIG. 6 the curved lines 29 on the Belief Map represent the calculated belief in the alternative's feature meeting the target. The numerical values 30 are those calculated using the formulas above. These compute the exact Bayesian posterior probability.

Values 30 also represent 1—evaluation risk. Evaluation risk is the exposure to chance that the alternative chosen will not be able to meet the targets set for it. In other words, it is the chance that the decision-maker's evaluation is not correct. Risk is a result of limitations in knowledge and confidence.

The expected value or satisfaction of each of the alternatives, the results of decision analysis 4 of FIG. 1 is displayed in the current embodiment on the bar chart 11, FIG. 2. In this embodiment, the highest bar represents the most satisfactory alternative. Prior art only finds a single value of satisfaction for each alternative. By allowing satisfaction to be calculated using each member's importance weightings and based on all the knowledge and confidence evaluation information, this invention adds the ability to look at satisfaction (and all other results) from each member's viewpoint.

The decision analysis 4 of FIG. 1 is unique in its ability not only to calculate satisfaction, but also, based on the information input through the decision-maker evaluation 3 of FIG. 1 to find the probability that each alternative has the highest satisfaction. In the current embodiment, the value for the probability 31 of FIG. 2 is shown in the satisfaction bar chart 11. An alternative that may have the highest satisfaction may not have a particularly high probability of being the best. The ideal is to choose an alternative that has high satisfaction and a high probability of having the highest satisfaction regardless of viewpoint taken.

Figure 9:
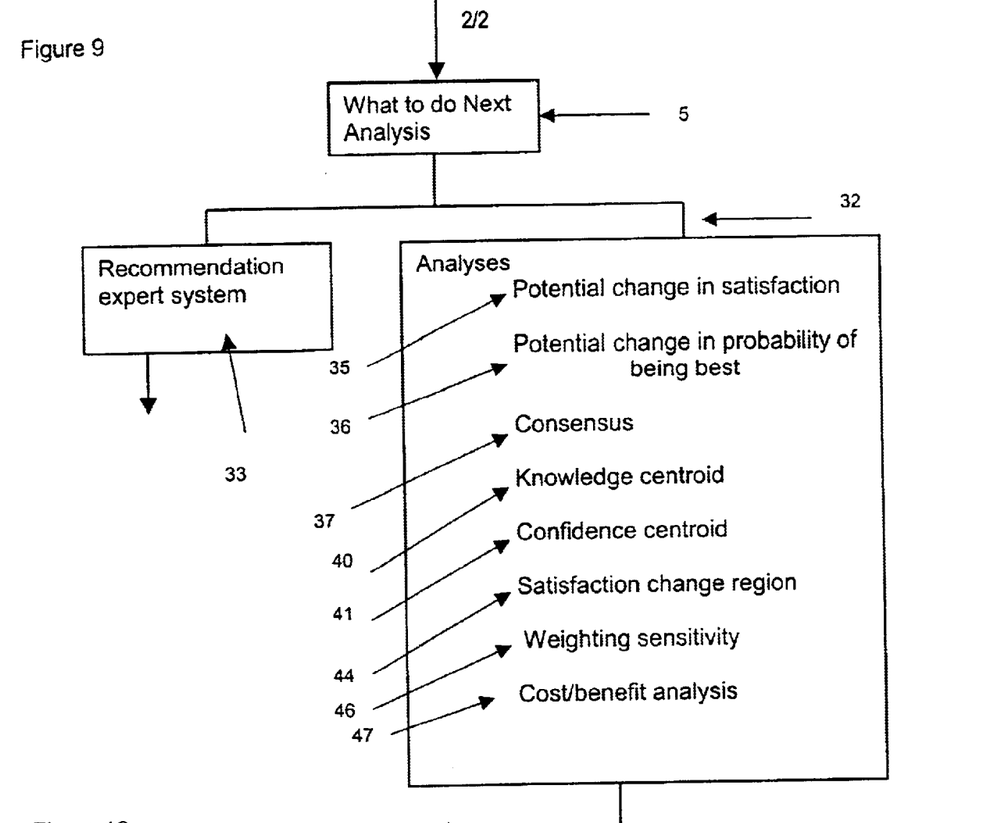
FIG. 9 details the "what to do next" analysis.

Usually the first evaluation of alternatives by the decision-makers does not end in a decision, but rather an indication of where further evaluation or other rethinking is necessary to reach a decision. The "what to do next evaluation" 5 of FIG. 1 expanded in FIG. 9 provides the decision-makers with guidance. This material is unique to this invention. Shown in FIG. 9 are a list of analyses 32 and a recommendation expert system 33 that comprise the "what to do next evaluation" 5.

The "what to do next evaluation" 5 provides sensitivity analyses 35 and 36 that relates to the decision-makers, for each feature of each alternative, the potential change in satisfaction 35 or change in probability 36 of being best, that can result from further evaluation. In the current embodiment, the most sensitive alternatives/criterion pairs are listed 12 of FIG. 2 with most sensitive first.

The statistics for sensitivity analyses 35 and 36 can be calculated in many ways: Unweighted satisfaction or probability based on evaluation with a virtual team member who is an expert with complete and accurate knowledge, and who is either fully delighted or completely disgusted with the alternative's ability to meet the criterion. Weighted satisfaction or probability based on evaluation with a virtual team member who is an expert with complete and accurate knowledge, and who is either fully delighted or completely disgusted with the alternative's ability to meet the criterion. In either case this analysis is the value of perfect information 57 of FIG. 12. It is calculated for each criterion/alternative combination by:

$$VPI(C_c|A_a)=P(S(C_c|A_a)=\text{yes}*Ev(\text{Decision}|S(C_c|A_a)=\text{yes})+\\P(S(C_c|A_a)=\text{no}*Ev(\text{Decision}|S(C_c|A_a)=\text{no})-Ev(\text{Decision})$$

where $Ev(\text{Decision}|S(C_c|A_a))=\text{yes}$ is computed as for $Ev(\text{Decision})$, but with a pair of nodes added indicating perfect knowledge and confidence that alternative a will satisfy criterion C (K=I.0, C=1.0), and $Ev(\text{Decision}|S(C_c|A_a))=\text{no}$ is similarly computed, but with the added nodes recording perfect knowledge and confidence that the alternative will not satisfy the criterion (K=I.0, C=0.0). Note that $P(S(C_c|A_a)=\text{yes})$ and $P(S(C_c|A_a)=\text{no})$ must be computed before any perfect knowledge nodes are added. This value can then be used, as is standard in decision analysis, to order the utilities of obtaining additional information about the probability of satisfaction of various criterion/alternative pairs.

Figure 10:
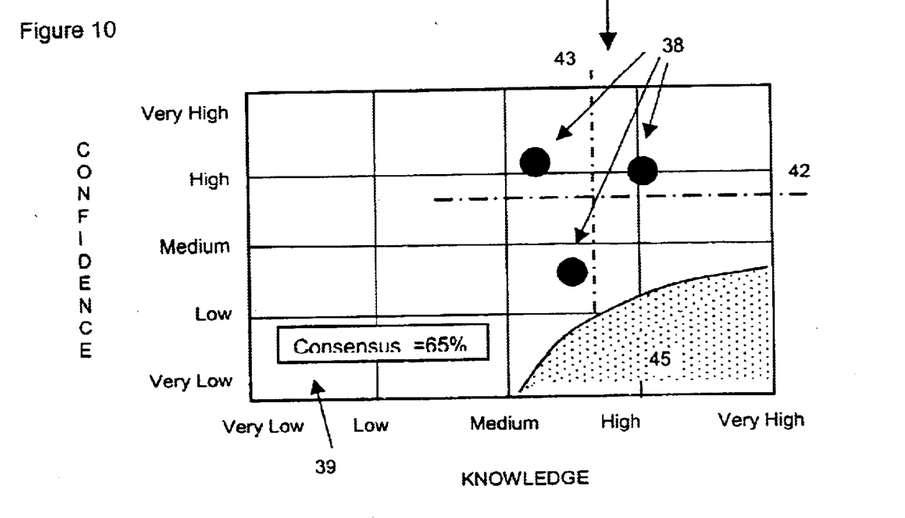
FIG. 10 shows some of the results of the "what to do next" analysis on a Belief Map.

When teams of decision-makers are evaluating alternatives, there will naturally be differences in the team members' knowledge 15, 22 and confidence 16, 21 as shown by points 38 of FIG. 10. The "what to do next evaluation" 5 calculates the level of consensus 37 based on this evaluation information. The analysis takes into account that differences in knowledge are less important to consensus than are differences in confidence in the alternative's ability to meet the criterion. This is evident in the math. To develop the level of consensus value, the confidence centroid must first be developed.

The confidence centroid 41 FIG. 9, 43 FIG. 10 is the weighted sum of the confidence values for each member, weighted by member knowledge, as shown by the pseudo-code below:

```
centroid=0.0;
kSum=0.0;
for (int m=0; m<members.size( ); m++) {
  k=2*(knowledge(a, c, m)-0.49);
  centroid+=k*confidence(a, c, m);
  kSum+=k;
}
centroid=centroid/kSum;
```

In the current embodiment, the confidence centroid is not displayed to the decision-makers.

To help guide the decision-makers, the "what to do next evaluation" 5 also calculates for each feature of each alternative evaluated by the decision-makers a region 44 of the belief map that indicates where the team's centroid must fall to change the satisfaction ranking and the probability of being best of the alternative. One such region in the current embodiment is shown 45 in FIG. 10.

In the current implementation, consensus 39 is shown in the lower left corner of the Belief Map when performing a "what to do next evaluation." Consensus is the normalized additive inverse of the knowledge-weighted sum of the difference between member confidence and the confidence centroid, as shown by the pseudo-code below:

```
consensus=0.0;
for (int m=0; m<members.size( ); m++) {
  k=2*(knowledge(a, c, m).-0.49);
  distance=
    k*(centroid-confidence(a, c, m));
  consensus+=distance*distance;
  kSumSq+=k*k;
}
consensus=Math.sqrt(consensus/kSumSq);
normalizedConsensus=1.0-(2*consensus);
```

Also developed is the knowledge centroid 40, 42 for each feature of each alternative evaluated by the decision-makers. This is needed for the recommendation expert system 33. In the current embodiment this centroid is not shown to the decision makers.

Sensitivity of the satisfaction or probability of being best based on importance weightings 46 are also accomplished. Prior art either uses a single decision-maker's importance weightings 13 or develops an average importance weighting and has no methodology for exploring decision-making team variation on the results. This invention honors the variety of viewpoints that are important in a complex decision by not only developing the satisfaction, the probability of being best and "What to do next" analysis from each viewpoint, but also calculating the sensitivity of these results to the variation in these viewpoints. This invention uses the statistical distribution of importance weightings for each criterion as a basis for a Monte Carlo analysis of the statistics for the satisfaction and probability of being best.

Each criterion weight is sampled from the range defined by the weights assigned by members (that is, the range extending from the lowest assigned weight to the highest assigned weight for that criterion, using a uniform sampling distribution (this could be generalized to any suitable distribution, perhaps incorporating the distribution of assigned weights if more than two members). The expected value of each alternative is then computed, and the best alternative noted for each weight sample.

Figure 11:
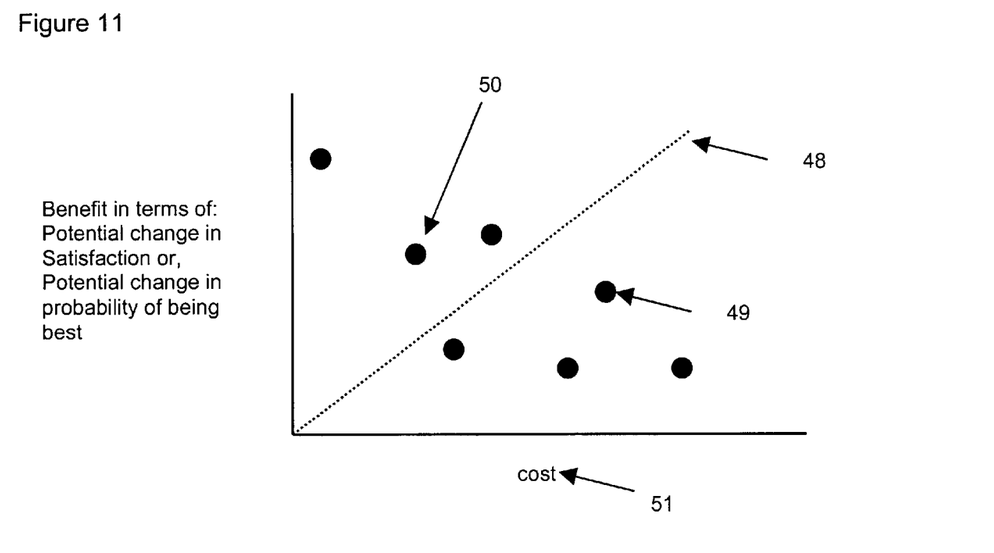
FIG. 11 shows one method of displaying a cost/benefit analysis.

The potential changes in satisfaction 35 and probability of being best 36 give the potential benefits of further decision-maker evaluation 3 of FIG. 1. This combined with decision maker input of the costs (either in terms of money or time) for each of the extended analyses results in the data needed for a cost/benefit analysis 47. FIG. 11 shows one embodiment of the cost benefit display with cost 51 either in terms of time or money, plotted against benefit in terms of satisfaction 35 and probability of being best 36 for a specific feature of a specific alternative. In FIG. 11, points for each feature of each alternative 49,50 are plotted showing the potential benefit that could result from continued decision-maker evaluation plotted against the cost. A line representing a threshold 48 separates the points into those worth pursuing 50 and those not worth pursuing 49.

Guidance for what to do next 33, FIG. 9, uses the statistics generated in the analyses 32, to help the decision-makers decide the next best steps in reaching a decision. Using an internal rule base, the what to do next analysis takes the information developed and generates a list of what the decision-maker(s) should do next to improve the differentiation in satisfaction between the highest ranked alternative or the probability that the highest ranked alternative is best. Based on the statistics, the rule base recommends one or more of the following:

<Alternative x> has high satisfaction and probability of being the first choice is high from all viewpoints, you may want to choose it.

<Alternative x/Feature y> is sensitive and consensus evaluation is low. Discussion about this is advised.

Knowledge of <alternative x/Feature y> is sensitive and consensus evaluation is low. Develop more information using experiments, analysis or experts.

<Criteria x and y> are weak yet important. Refine these criteria features and targets.

The team is having difficulty differentiating between alternatives, either generate new criteria that better measure features that vary from alternative to alternative or generate new alternatives.

None of the alternatives have very high satisfaction. Generate new alternative solutions.

The importance weightings vary too much among team members to reach consensus. Discuss importance weightings.

This information can be used to choose a specific alternative or to return to any prior activity and refine the problem description, the customer viewpoint or the evaluation. Since the analysis can be based on the input of many decision-makers, it is important to be able include or exclude their evaluations as part of exploring the results. Thus, it is possible to discount an individual's knowledge to see the effect on the results. This is not the same as changing the importance as in 13 but lowers the influence of a discounted member's evaluation on calculation of satisfaction and other statistics. This facility allows using one individual's evaluation independently as seen from each member's viewpoint or reducing the effect of one person whose knowledge self estimate is deemed too high.

The above invention can be used to support any type of decision-making problem where there are multiple alternatives, criteria for evaluating the alternatives and an individual or team judging the alternative relative to the criteria. It can also be applied to specific types of problems. One area of application is the purchase of goods. In such cases there is an additional element, a suggestion engine.

A suggestion engine that takes a set of alternative purchases identified by a buyer and compares it to sets of purchase alternatives of other buyers to recommend additional alternatives for consideration. It accepts and stores any level of information from a multi-level decision model purchasers build while shopping; extracts a background representation of the features purchasers consider important from inputs of multiple purchasers, extracts feature ratings for products from inputs of multiple users, generates product recommendations based on aggregated past input, plus the purchaser's current model, regardless of level of detail in the model selects user-specific advertising based on the above information. An embodiment of this uses a drag and drop method for building multi-level purchase decision models. The multi-level is key, as it can work with just a choice set, or just choice and tradeoffs.

Figure 13:
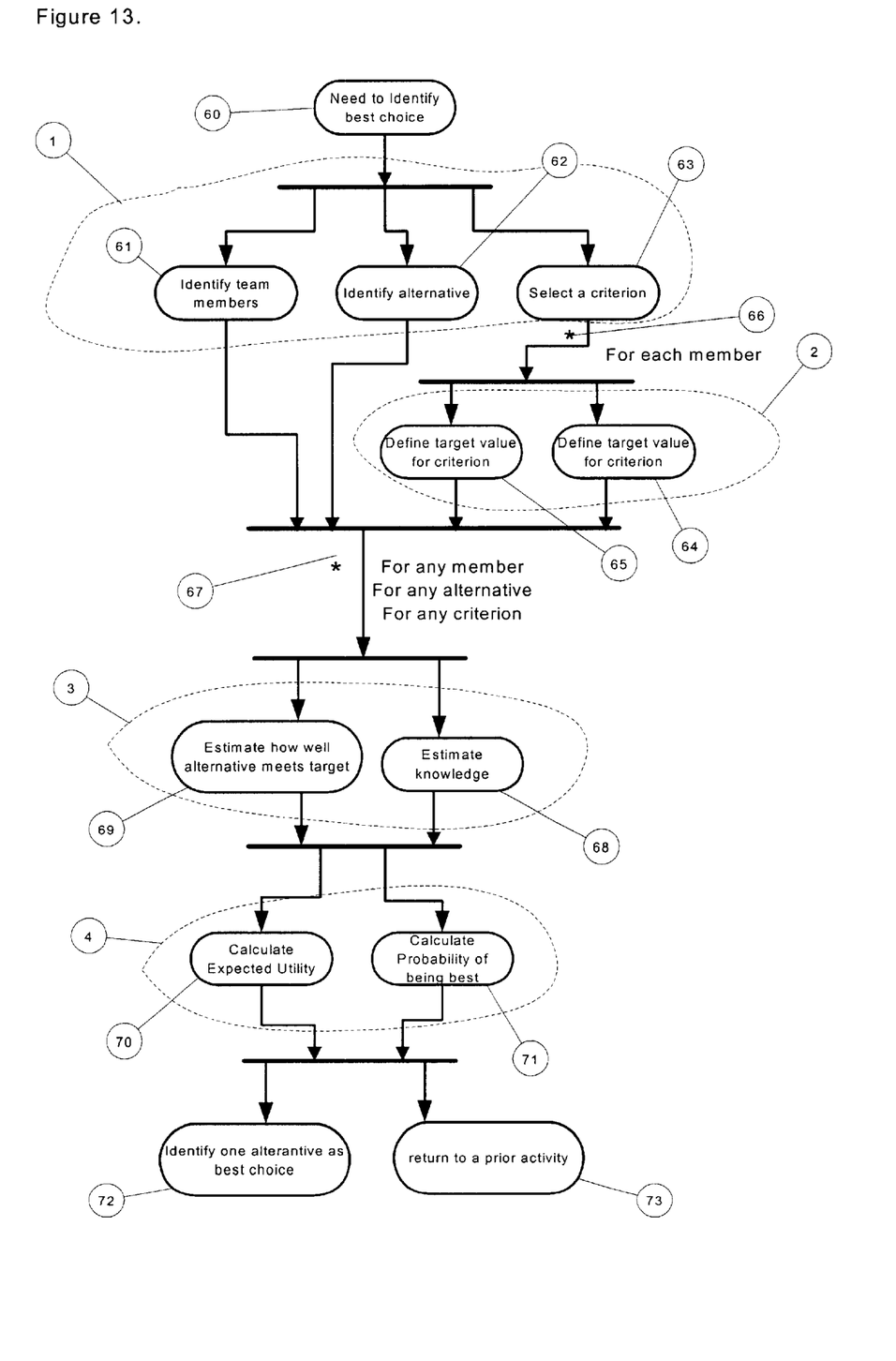
FIG. 13 shows an activity diagram for core methodology.
Figure 14:
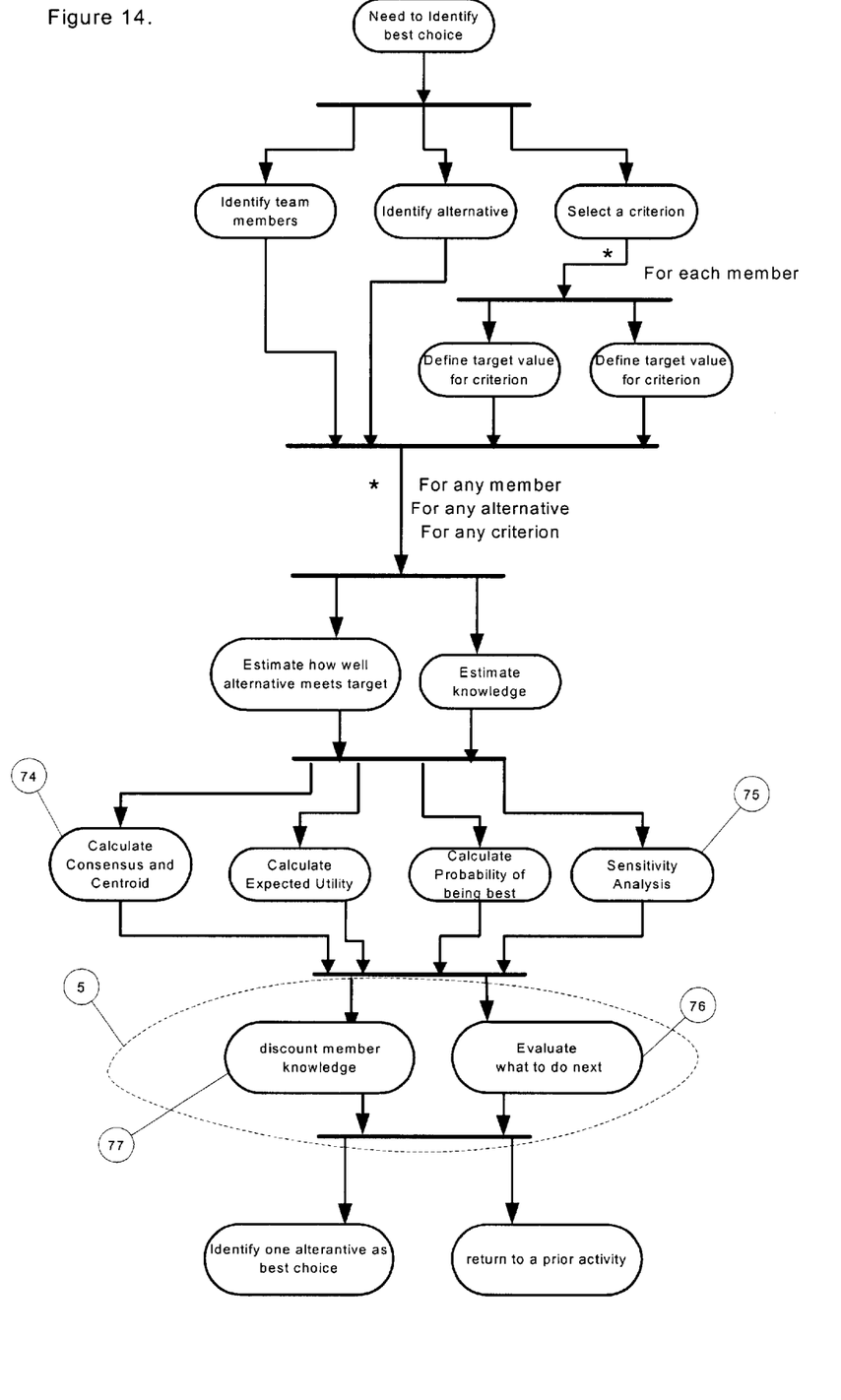
FIG. 14 shows an activity diagram for complete methodology.

FIGS. 13 and 14 detail the flow of activities in the invention. These are in the format of UML Activity Diagrams. FIG. 13 shows the core methodology. The first activity is to identify the problem for which a best choice is needed, 60. To fully describe the problem, 1 in FIG. 1, team members 61, alternatives 62 and criteria 63 must be identified. As shown by the notation of the activity diagram, these can happen in any order, as is the case in the embodiment, FIG. 2.

Each member's viewpoint is captured 2, by defining a target for each criterion 64, and setting weights 65, as in FIG. 2. As shown in the notation 66, viewpoint can be set for each member and in any order.

Decision-maker evaluation 3, can be made by any member for and alternative as measured by any criterion as is shown in the notation 67. Evaluation requires estimating the member's knowledge 68 about the feature defined by the chosen criterion of the chosen alternative, and the member's confidence about how well the alternative meets the target set by the criterion 69.

Based on the above information, the analysis 4, in the core methodology calculates the expected utility, 70 and the probability of being best 71. As shown in FIG. 14, additional calculations include the Consensus and Centroid 74, and Sensitivity 75. In the core methodology, the result of these analyses is used to either identify one alternative as the best choice 72 or to return to any prior activity in the problem description, viewpoint capture or decision-maker evaluation for refinement 73.

In FIG. 14 the additional capability of the "what to do next evaluation" 76 and discounting member knowledge 77 are shown to proceed 72 and 73. These additional forms of evaluation give the ultimate decision maker(s) more information on which to decide on the best choice or iteration.

Figure 15:
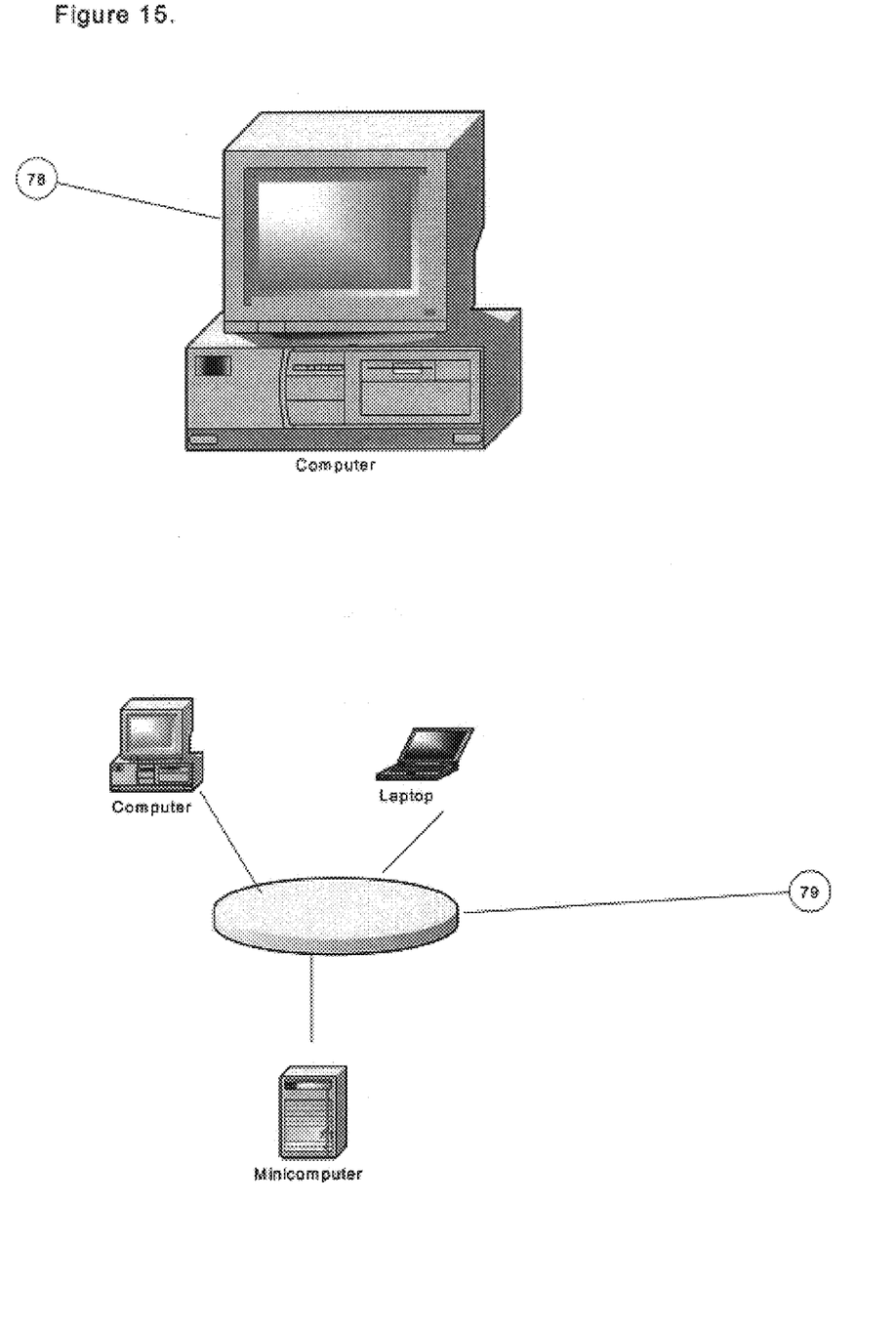
FIG. 15 shows a computer system on which invention can be operated.

Finally, any embodiment of this invention can be run on an individual computer 77 or a network of computers 78 as shown in FIG. 15.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for processing information to identify a best choice from among a set of alternatives, the method comprising:

identifying a plurality of team members;

selecting a criterion for use in identifying the best choice, wherein the criterion includes a feature of the alternatives;

for each alternative:

for each team member, defining a target value for the feature;

for each team member, setting a level of knowledge for the feature of the criterion;

for each team member, estimating how well at least one of the alternatives meets the team member's target value for the feature of the criterion based on the team member's level of knowledge;

calculating an expected utility for each alternative based on the feature value estimations of all the team members;

calculating a probability that each alternative is best based on the feature value estimations of all the team members; and identifying one of the set of alternatives as the best choice according to the expected utility for each alternative.

2. A method according to claim 1, wherein:

selecting a criterion includes selecting a plurality of criteria for use in identifying the best choice;

the method further comprises, for each team member, assigning weights to the plurality of criteria;

setting a level of knowledge includes, for each team member, setting a level of knowledge for each criteria;

estimating how well at least one of the alternatives meets the team member's target value includes estimating how well at least one of the alternatives meets at least one of the team members' target value for the feature of at least one of the criterion based on the team member's level of knowledge of the feature; and calculating a expected utility includes:

for each criteria, calculating a fused belief from the feature value estimations of all team members;

weighing the fused beliefs of all criteria based on the weights assigned to the plurality of criteria for a first team member; and calculating a expected utility for the alternative based on the weighted fused beliefs of all criteria.

3. A method according to claim 2, wherein calculating a probability includes calculating a probability that the alternative is best based on all the feature value estimations of all the team members.

4. A method for processing information to identify a best choice from among a set of alternatives, the method comprising:

identifying a plurality of team members;

selecting a criterion for use in identifying the best choice, wherein the criterion includes a feature of the alternatives;

for each alternative:

for each team member, defining a target value for the feature;

for each team member, setting a level of knowledge for the feature;

for each team member, estimating how well at least one of the alternatives meets the team member's target value based on the team member's level of knowledge for the feature of the criterion;

calculating an expected utility for each alternative and a probability of each alternative being best based on the feature value estimations of all the team members;

identifying one of the set of alternatives as the best choice according to the expected utility for each alternative; and performing a sensitivity analysis to inform the team members what information can change a ranking of the alternatives, where the sensitivity analysis is based on one of at least a distribution of criteria weights across all team members, a distribution of the level of knowledge of each team member, and a distribution of the feature value estimations.

5. A method according to claim 4, wherein performing a sensitivity analysis includes calculating, for each alternative, a weighted expected utility for each alternative or probability of each alternative being best based on a virtual team member who is an expert and is alternatively completely satisfied and completely dissatisfied with the alternative.

6. A method according to claim 4, wherein:

selecting a criterion includes selecting a plurality of criteria for use in identifying the best choice;

the method further comprises, for each team member, assigning the criteria weights to the plurality of criteria.

7. A method for processing information to identify a best choice from among a set of alternatives, the method comprising:

identifying a plurality of team members;

selecting a criterion for use in identifying the best choice, wherein the criterion includes a feature of the alternatives;

for each alternative:

for each team member, defining a target value for the feature;

for each team member, setting a level of knowledge for the feature;

for each team member, estimating how well at least one of the alternatives meets the team member's target value based on the team member's level of knowledge for the feature of the criterion;

determining a team consensus for each criteria/alternative pair; and identifying one of the set of alternatives as the best choice.

8. A method for processing information to identify a best choice from among a set of alternatives, the method comprising:

identifying a plurality of team members;

selecting a criterion for use in identifying the best choice, wherein the criterion includes a feature of the alternatives;

for each alternative:

for each team member, defining a target value for the feature;

for each team member, setting a level of knowledge for the feature;

for each team member, estimating how well at least one of the alternatives meets the team member's target value based on the team member's level of knowledge for the feature of the criterion;

determining a centroid of the feature value estimations;

determining a region of knowledge and confidence into which the centroid must fall to change the satisfaction ranking of the alternative; and identifying one of the set of alternatives as the best choice.

9. A method for processing information to identify a best choice from among a set of alternatives, the method comprising:

identifying a plurality of team members;

selecting a criterion for use in identifying the best choice, wherein the criterion includes a feature of the alternatives;

for each alternative:

for each team member, defining a target value for the feature;

for each team member, setting a level of knowledge for the feature;

for each team member, estimating how well at least one of the alternatives meets the team member's target value based on the team member's level of knowledge for the feature of the criterion;
calculating an expected utility for each alternative and probability of each alternative being best based on the feature value estimations of all the team members;
identifying one of the set of alternatives as the best choice according to the expected utility of each alternative; and
suggesting additional evaluations to each team member that would aid in identifying the best choice.

10. A method according to claim 9, wherein suggesting additional evaluations includes suggesting that the team members have done sufficient analysis and there is low risk in making a decision based on current information.

11. A method according to claim 9, wherein suggesting additional evaluations includes suggesting additional evaluations using at least one of the expected utility for each alternative, a probability of each alternative being best based on a virtual team member who is an expert and is alternatively completely satisfied and completely dissatisfied with the alternative, a distribution of team consensuses and the distribution of criteria weights.

12. A method according to claim 11, wherein:
selecting a criterion includes selecting a plurality of criteria for use in identifying the best choice;
the method further comprises, for each team member, assigning weights to the plurality of criteria; and
suggesting additional evaluations includes suggesting additional evaluations using at least one of the expected utility for each alternative, a probability that each alternative is best, a distribution of team consensuses on a belief map, a set of types for the plurality of criteria, and a distribution of weights for the plurality of criteria.

13. A method according to claim 9, wherein suggesting additional evaluations includes using an internal rule base to determine suggestions for the team members.

14. A method for processing information to identify a best choice from among a set of alternatives, the method comprising:
identifying a plurality of team members;
selecting a criterion for use in identifying the best choice, wherein the criterion includes a feature of the alternatives;
for each alternative:
for each team member, defining a target value for the feature;
for each team member, setting a level of knowledge for the feature of the criterion;
discounting the level of knowledge for at least one team member;
for each team member, estimating how well at least one of the alternatives meets the team member's target value for the feature of the criterion based on the team member's level of knowledge;
calculating an expected utility for each alternative based on the feature value estimations of all the team members;
calculating a probability that each alternative is best based on the feature value estimations of all the team members; and
identifying one of the set of alternatives as the best choice according to the expected utility for each alternative.

15. A system for processing information on a computer to reach a consensus among a plurality of team members on a decision, the system comprising:
a set of alternatives from which to select;
for each team member, a knowledge level;
at least a first criterion to be used by the plurality of team members to select one of the alternatives; and
a computer adapted to aid the plurality of team members in selecting one of the alternatives using the criterion, the computer including a user display adapted to display an expected utility for each alternative and probability that each alternative is best.

16. A system according to claim 15, wherein the computer includes means for discounting the knowledge level of at least one team member before calculating the expected utility for each alternative and the probability that each alternative is best.

17. A system for processing information on a computer to reach a consensus among a plurality of team members on a decision, the system comprising:
a set of alternatives from which to select;
for each team member, a knowledge level;
at least a first criterion to be used by the plurality of team members to select one of the alternatives; and
a computer adapted to aid the plurality of team members in selecting one of the alternatives using the criterion, the computer adapted to perform a sensitivity analysis and inform the team members as to what information can change a ranking of the alternatives by satisfaction levels.

18. A system for processing information on a computer to reach a consensus among a plurality of team members on a decision, the system comprising:
a set of alternatives from which to select;
for each team member, a knowledge level;
at least a first criterion to be used by the plurality of team members to select one of the alternatives; and
a computer adapted to aid the plurality of team members in selecting one of the alternatives using the criterion, the computer including a user display adapted to suggest a course of action for the team members to consider.

19. A system for processing information on a computer to reach a consensus among a plurality of team members on a decision, the system comprising:
a set of alternatives from which to select;
for each team member, a knowledge level;
at least a first criterion to be used by the plurality of team members to select one of the alternatives; and
a computer adapted to aid the plurality of team members in selecting one of the alternatives using the criterion, the computer adapted to perform a sensitivity analysis and inform the team members what information can change a ranking of the alternatives by probabilities of being the best choice.

20. A system for processing information on a computer to reach a consensus among a plurality of team members on a decision, the system comprising:
a set of alternatives from which to select;
for each team member, a knowledge level;
at least a first criterion to be used by the plurality of team members to select one of the alternatives; and
a computer adapted to aid the plurality of team members in selecting one of the alternatives using the criterion, the computer adapted to calculate a level of consensus among the team members as to which alternative is best.

21. A system according to claim 20, wherein the computer includes a user display adapted to display the level of consensus on a belief map.

22. A computer-readable medium containing a program to process information on a computer to identify a best choice from among a set of alternatives by a plurality of team members, the program comprising:
- identification software to identify a plurality of team members;
- selection software to select a criterion for use in identifying the best choice, wherein the criterion includes a feature of the alternatives;
- for each alternative:
  - for each team member, definition software to define a target value for the feature;
  - for each team member, setting software to set a level of knowledge for the feature of the criterion;
  - for each team member, estimation software to estimate how well at least one of the alternatives meets the team member's target value for the feature of the criterion based on the team member's level of knowledge;
- calculation software to calculate an expected utility for each alternative based on the feature value estimations of all the team members;
- calculation software to calculate a probability that each alternative is best based on the feature value estimations of all the team members; and
- identification software to identify one of the set of alternatives as the best choice according to the expected utility for each alternative.

23. A computer-readable medium containing a program to process information on a computer to identify a best choice from among a set of alternatives by a plurality of team members, the program comprising:
- identification software to identify a plurality of team members;
- selection software to select a criterion for use in identifying the best choice, wherein the criterion includes a feature of the alternatives;
- for each alternative:
  - for each team member, definition software to define a target value for the feature;
  - for each team member, setting software to set a level of knowledge for the feature of the criterion;
  - for each team member, estimation software to estimate how well at least one of the alternatives meets the team member's target value for the feature of the criterion based on the team member's level of knowledge;
- calculation software to calculate an expected utility for each alternative based on the feature value estimations of all the team members;
- identification software to identify one of the set of alternatives as the best choice according to the expected utility for each alternative; and
- performance software to perform a sensitivity analysis to inform the team members what information can change a ranking of the alternatives by satisfaction levels, where the sensitivity analysis is based on one of at least a distribution of criteria weights across all team members, the expected utility for each alternative, and probabilities of each alternative being the best choice.

24. A computer-readable medium containing a program to process information to identify a best choice from among a set of alternatives, the program comprising:
- identification software to identify a plurality of team members;
- selection software to select a criterion for use in identifying the best choice, wherein the criterion includes a feature of the alternatives;
- for each alternative:
  - for each team member, definition software to define a target value for the feature;
  - for each team member, setting software to set a level of knowledge for the feature of the criterion;
  - for each team member, estimation software to estimate how well at least one of the alternatives meets the team member's target value for the feature of the criterion based on the team member's level of knowledge;
- determination software to determine a team consensus for each criteria/alternative pair; and
- identification software to identify one of the set of alternatives as the best choice.

25. A computer-readable medium containing a program to process information to identify a best choice from among a set of alternatives, the program comprising:
- identification software to identify a plurality of team members;
- selection software to select a criterion for use in identifying the best choice, wherein the criterion includes a feature of the alternatives;
- for each alternative:
  - for each team member, definition software to define a target value for the feature;
  - for each team member, setting software to set a level of knowledge for the feature;
  - for each team member, estimation software to estimate how well at least one of the alternatives meets the team member's target value based on the team member's level of knowledge for the feature of the criterion;
- determination software to determine a centroid of the feature value estimations;
- determination software to determine a region of knowledge and confidence into which the centroid must fall to change the satisfaction ranking of the alternative; and
- identification software to identify one of the set of alternatives as the best choice.

26. A computer-readable medium containing a program to processing information to identify a best choice from among a set of alternatives, the program comprising:
- identification software to identify a plurality of team members;
- selection software to select a criterion for use in identifying the best choice, wherein the criterion includes a feature of the alternatives;
- for each alternative:
  - for each team member, definition software to define a target value for the feature;
  - for each team member, setting software to set a level of knowledge for the feature of the criterion;
  - for each team member, estimation software to estimate how well at least one of the alternatives meets the team member's target value for the feature of the criterion based on the team member's level of knowledge;
- calculation software to calculate an expected utility for each alternative based on the feature value estimations of all the team members;

identification software to identify one of the set of alternatives as the best choice according to the expected utility for each alternative; and suggestion software to suggest additional evaluations to each team member that would aid in identifying the best choice.

27. A method for processing information to identify a best choice from among a set of alternatives, the method comprising:

identification software to identify a plurality of team members;

selection software to select a criterion for use in identifying the best choice, wherein the criterion includes a feature of the alternatives;

for each alternative:

for each team member, definition software to define a target value for the feature;

for each team member, setting software to set a level of knowledge for the feature of the criterion;

discounting software to discount the level of knowledge for at least one team member;

for each team member, estimation software to estimate how well at least one of the alternatives meets the team member's target value for the feature of the criterion based on the team member's level of knowledge;

calculation software to calculate an expected utility for each alternative based on the feature value estimations of all the team members;

calculation software to calculate a probability that each alternative is best based on the feature value estimations of all the team members; and     identification software to identify one of the set of alternatives as the best choice according to the expected utility for each alternative.

* * * * *